FIP8502 OR 3,275,860 SEARCH ROO
Sept. 27, 1966 S. WAY 3,275,860
ELECTRODE STRUCTURES FOR AN MHD GENERATOR
Filed July 13, 1962
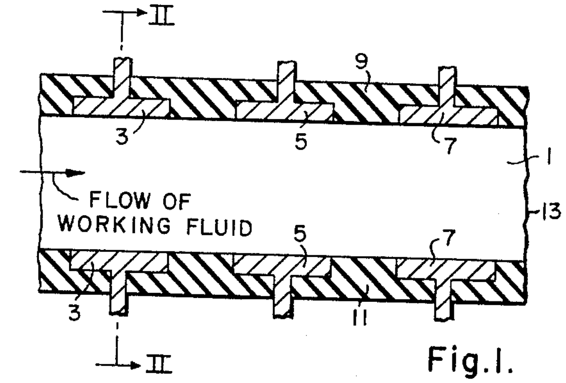
Fig. 1.
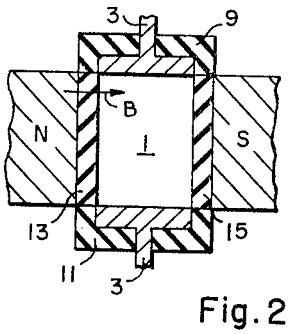
Fig. 2.
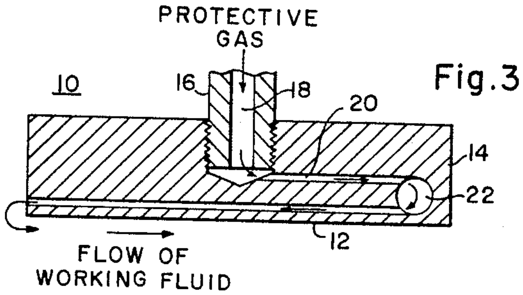
Fig. 3.
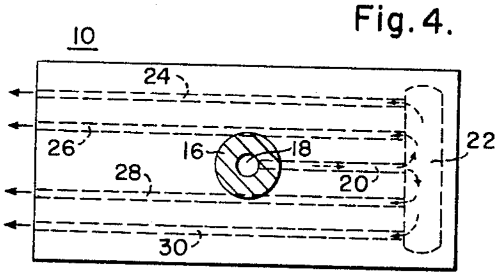
Fig. 4.
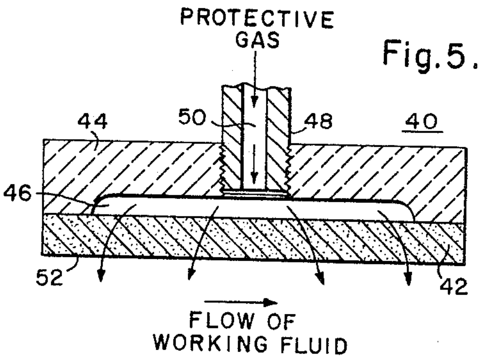
Fig. 5.
Fig. 6.
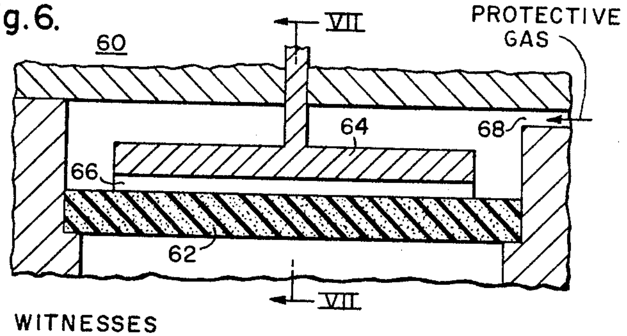
Fig. 7.
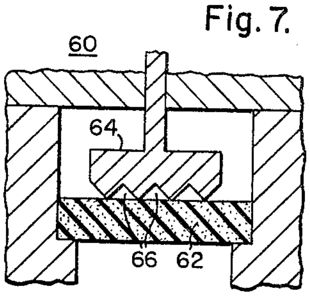
WITNESSES
Edwin E. Bassler
James F. Young
INVENTOR
Stewart Way
BY F. P. Lyle
ATTORNEY

United States Patent Office 3,275,860
Patented Sept. 27, 1966

3,275,860

ELECTRODE STRUCTURES FOR AN MHD GENERATOR

Stewart Way, Pittsburgh, Pa., assignor to Westinghouse Electric Corporation, East Pittsburgh, Pa., a corporation of Pennsylvania Filed July 13, 1962, Ser. No. 209,575
7 Claims. (Cl. 310—11)

The present invention relates to high temperature electrode structures, and more particularly to electrode structures for current collection in magnetohydrodynamic accelerators and generators.

The conventional process of generating electrical power comprises moving metallic conductors through a magnetic field. Generally, the energy conversion is from heat to mechanical to electrical energy. Electrical energy can also be generated by moving fluid conductors in a magnetic field. However, in order to have a direct conversion from thermal to electrical energy, it is necessary to use a gas in order to realize an appreciable volume change. Large amounts of electrical energy may be efficiently generated through the use of magnetohydrodynamic techniques. A magnetohydrodynamic generator utilizes a thermally ionized working fluid, generally a combustion product gas which is thermally ionized and seeded with an alkali metal to make the gas more conductive. The ionized gas is then passed through a transverse magnetic field. Current collecting electrodes are placed along the flow of the ionized gas to collect current that is generated due to the movement of the electrically conducting gas in the presence of the magnetic field.

The general theory and operation of a magnetohydrodynamic MHD generator is fully described in copending application Ser. No. 202,714, entitled Magnetohydrodynamic Generator Apparatus, filed June 15, 1962, by the same inventor and assigned to the same assignee as the present invention. As disclosed in the above copending application, in order to obtain an efficient cycle of operation, it is necessary that the thermally ionized gas be maintained in a highly conductive state. Thus, the gas must be kept at a high temperature, of the order of 2500° K. Using combustion product gases, which contain an appreciable fraction of oxygen, perhaps 5%, as well as carbon dioxide and water, due to dissociation, gives rise to the problem of electrode durability. This problem is present because most materials which are electrical conductors and are able to stand high temperatures of 4000 to 5000° F. are also oxidizable. One solution might be to use oxide electrodes, such as zirconium oxide, but other problems then come into play of making the external circuit connections to the hot zirconia.

It is therefore an object of the present invention to provide new and improved electrode structures for use in magnetohydrodynamic thermal to electrical energy conversion apparatus.

It is a further object of the present invention to provide new and improved electrode structures for use in magnetohydrodynamic thermal to electrical energy conversion apparatus in which the electrode is cooled to some degree, a layer of oxygen free gas is provided at the electrode surfaces, and an electrically conducting gas layer is maintained at the electrode surfaces.

Broadly, the present invention provides an electrode structure for use in magnetohydrodynamic energy conversion apparatus, wherein, a flow of thermally ionized working fluid is passed adjacent to a surface of the electrodes, with the electrode structure being such that an electrically conducting protective gas is passed through the electrode into the flow of thermally ionized working fluid. The protective gas thus acts to provide a layer of oxygen free gas near the surface of the electrode and to maintain an electrically conducting gas layer between the electrode and the working fluid.

These and other objects will become more apparent when considered in view of the following specification and drawings, in which:

FIGURE 1 is a schematic diagram of a MHD generator chamber;

FIG. 2 is a sectional view of FIGURE 1 taken at line II—II;

FIG. 3 is a front view in section of one embodiment of the present invention;

FIG. 4 is a bottom view of the embodiment of FIG. 3;

FIG. 5 is a longitudinal section view of another embodiment of the present invention;

FIG. 6 is a front view of still another embodiment of the present invention; and FIG. 7 is a sectional view of FIG. 6 taken at line VII—VII of FIG. 6.

Referring to FIGS. 1 and 2, a typical MHD generating chamber is shown. Placed along the duct 1 and adjacent to the flow of working fluid are the electrically conducting electrode pairs 3, 5 and 7, which are held in place through the top insulating member 9 and the bottom insulating member 11. Electrical connections are made to the electrodes through the insulating members 9 and 11 to an external load, not shown. The insulating side wall members 13 and 15 are disposed between the electrodes to form the other boundaries of the duct 1. The magnetic pole members N and S are placed about the wall members 13 and 15 to provide a transverse magnetic field B to the flow of working fluid in the duct 1. Thus, as the electrically conducting working fluid passes through the transverse magnetic field B, a current is generated, which is collected by the electrode pairs 3, 5 and 7.

Referring to FIGS. 3 and 4, an electrode structure 10 is shown having a collecting surface 12 disposed adjacent to the flow of ionized working fluid, which in the present case is assumed to consist of alkali seeded combustion product gases. The base member 14 of the electrode structure 10 may for example comprise an electrically conducting material, such as graphite, or a refractory metal, such as tungsten or tantalum. Threaded into the base member 14 is an electrode stem 16. The electrode stem 16 may comprise an electrically conducting material such as tungsten or tantalum. Through a hole 18 in the stem member 16 a blanketing gas is passed. The blanketing gas, for example, may comprise hydrogen with perhaps 1% of potassium added as a seeding element. Such a gas, at 2300 to 2500° K., will be a reasonably good electrical conductor. On the other hand, helium would be 2½ times better as an electrical conductor than hydrogen. However, the helium being inert would not act with the free oxygen in the flow of the combustion gas working fluid. The protective gas passes from the stem member 16 into the tubular member 20 and therethrough into the manifold 22. Then this gas passes through the various tubes 24, 26, 28 and 30, which have one end open into the manifold 22 and the other end opened upstream of the electrodes to the flow of the working fluid. Thus, if the electrode 10 is disposed in the duct 1 in place of the electrode 3, for example, the upstream ends of the tubes 24, 26, 28 and 30 are disposed for discharging the protective gas flow into the adjacent boundary region of the working fluid flow. This can be done, for example, by sizing and locating the electrode 10 such that the discharge tubes are disposed inwardly of the inner surface of the wall 9 or, if a flush fit is desired, the wall 9 can be provided with suitable openings which cooperate with the discharge tubes in providing the protective discharge flow into the duct 1. The working fluid flows, as shown, near the surface 12 of the electrode 10, while the blanketing gas flows between the surface 12 and the working fluid.

With the layer of protective gas between the surface 12 and the flow of working fluid, the electrode is protected from chemical attack by the oxygen in the working fluid gas. If hydrogen is used as the protective gas, this will shift the gas composition near the surface 12 to one of lower oxygen concentration. On the other hand, if helium is used, the mechanism for protecting the electrode surface 12 will be one of blocking the diffusion of oxygen to the surface 12 of the electrode by the maintenance of a sufficient volume of flow of the helium gas. The advantage of using helium is that it is 2½ times better electrical conductor than is hydrogen, when appropriately seeded. In either case, the blanketing gas should be seeded with an alkali metal vapor, such as potassium, cesium or rubidium, in order to make it more conductive. Therefore, by providing an electrically conductive blanketing gas layer between surface 12 and the working fluid, there is still a good electrical conducting path to the electrode for the collection of current generated in the MHD duct, while also protecting the electrode surface from deterioration.

FIG. 5 shows another embodiment which may be utilized to gain the advantages of the present invention. The electrode structure 40 has a base member 42, which comprises a porous material. The porous material may, for example, be porous tungsten or tantalum, whose manufacture is well known in the art. Porous tungsten and tantalum are good electrical conductors and also have good high temperature characteristics. A covering member 44 is bonded, by welding or other means, to the porous member 42. The covering member 44 has a recessed area 46, which provides an open space to a substantial portion of the base member 42. The covering member 44 may, for example, comprise solid tungsten or another refractory metal. An electrode stem 48 is threaded into the covering member 44. The stem 48 may for instance comprise solid tungsten. The electrode stem 48 has a passage 50 provided therethrough into the area 46. Thus, a protective gas, which may comprise hydrogen or helium seeded with an alkali metal as discussed above, may pass through the passage 50 into the area 46 and then may pass through the porous base member 42 into the flow of working fluid. A protective layer of gas is then provided along the bottom surface 52 of the base member 42. This layer of gas between the surface 52 and the flow of working fluid acts to provide a layer of oxygen free gas at the electrode surface 52 while maintaining an electrically conducting layer therebetween. Also, this protective layer will act, to some degree, to cool the electrode surface.

Considering now FIGS. 6 and 7, another embodiment utilizing the teachings of the present invention is shown. In these figures, an electrode structure 60 is provided with a base member 62 of a porous insulatng material. The base member 62 may, for example, comprise zirconium oxide, calcium oxide or magnesium oxide, all of whose manufacture is well known in the art. An electrically conducting connecting member 64 is then disposed upon the base member 62. The connecting member 64 may comprise for example graphite, tungsten, tantalum or zirconium. The portion of the connecting member 64 adjacent the top of the base member 62 has a sawtooth configuration cut from the member 64 in order to allow free passage of protective gas therethrough. An inert gas, such as argon or helium, is then supplied through the orifice 68. The inert gas then passes down through the areas 66. This gas then may pass through the pores or interstices of the porous member 62 into the flow of ionized working fluid. The protective gas is seeded with an alkali metal, such as cesium or potassium, so that it is rendered conductive. Hydrogen could also be used as the coolant gas, but as the inert gases are better electrical conductors their use in this embodiment would be desirous for the reasons discussed infra.

A conductive path is not provided by the base member itself as in the previous examples, but, rather through the flow of conducting gas through the pores of the base member 62 which is non-conductor itself. Thus, current is collected through the actual flow of conducting gas, and then through the connecting member 64. In this example, carbon monoxide seeded with cesium or potassium could serve as the protective gas, alternatively to helium or argon. Moreover, combustion gas, which could be drawn from the main gas stream of the working fluid at some point downstream may be used as the protective gas. This gas taken downstream would be of a lower temperature and may be made fuel rich by carbonaceous or metallic fuel to decrease its oxygen concentration. Also, added alkali metal seeding can be added to the combustion product gas in order to increase its conductivity at the lower temperature. It may be seen that the connecting member 64 is completely bathed in an inert atmosphere and is thus not affected by oxidation. The insulating material of the base member 62 is directly adjacent to the high oxygen containing working fluid, but in that this material will not be affected by oxidation, the problem of preserving electrode life is averted. The protective gas admitted at orifice 68 and passing through member 62 must be sufficiently hot so that when properly seeded with alkali, it has conductivity at least as high as that of the main working fluid.

Although the present invention has been described with a certain degree of particularity, it should be understood that the present disclosure has been made only by way of example and that numerous changes in the details of construction, the materials used, the protective gas used and the combination and arrangement of parts may be resorted to without departing from the scope and spirit of the present invention.

I claim as my invention:

1. In energy conversion apparatus operative with a flow of thermally ionized working fluid, an electrode structure operative with an electrically conductive protective gas, said electrode structure comprising: a base member having a surface disposed adjacent said flow of ionized working fluid, and protective gas inlet means operative to supply said protective gas to said base member, and means forming a part of said base member through which said protective gas flows to provide an electrically conductive layer of protective gas between said surface and said flow of working fluid.

2. In magnetohydrodynamic energy conversion apparatus operative with a flow of thermally ionized working fluid; an electrode structure operative with an electrically conductive protective gas, said electrode structure comprising: a base member having a surface disposed adjacent said flow of ionized working fluid, and protective gas inlet means operatively connected to said base member and being operative to supply said protective gas to said base member, and means forming a part of said base member through which said protective gas flows to provide an electrically conductive layer of protective gas between said surface and said flow of working fluid.

3. In energy conversion apparatus operative with a flow of thermally ionized working fluid, an electrode structure operative with an electrically conductive protective gas, said electrode structure comprising: a base member having a surface disposed adjacent said flow of ionized working fluid, said base member comprising an electrically conductive material and having disposed therein a plurality of tubular members; and protective gas inlet means operatively connected to said base member and being operative to supply said protective gas to said tubular members to allow said protective gas to pass through said tubular members into said flow of working fluid to provide an electrically conductive layer of protective gas between said surface and said flow of working fluid.

4. In magnetohydrodynamic thermal to electrical energy conversion apparatus operative with a flow of thermally ionized working fluid; an electrode structure operative with an electrically conductive protective gas, said electrode structure comprising: a base member having a surface disposed adjacent said flow of ionized working fluid, said base member comprising an electrically conductive material at high temperatures and having disposed therein a plurality of tubular members placed substantially parallel to said flow of working fluid; and protective gas inlet means operatively connected to said base member and being operative to supply said protective gas to said tubular member to allow said protective gas to pass through said tubular members and into said flow of working fluid upstream of said electrodes to provide an electrically conductive layer of protective gas between said surface and said flow of working fluid.

5. In energy conversion apparatus operative with a flow of thermally ionized working fluid; an electrode structure operative with an electrically conductive protective gas, said electrode structure comprising: a porous base member having a surface disposed adjacent said flow of ionized working fluid, said base member comprising an electrically conductive material; and protective gas inlet means operatively connected to said porous base member and being operative to supply said protective gas to said porous base member with said protective gas passing therethrough to provide an electrically conductive layer of protective gas between said surface and said flow of working fluid.

6. In magnetohydrodynamic thermal to electrical energy conversion apparatus operative with a flow of thermally ionized working fluid; an electrode structure operative with an electrically conductive protective gas, said electrode structure comprising: a porous base member having a surface disposed adjacent said flow of ionized working fluid, said porous base member comprising a material which is electrically conductive at high temperatures and which is porous to allow said protective gas to pass through the pores thereof, and protective gas inlet means operatively connected to said protective base member and being operative to supply said protective gas to said base member with said protective gas passing therethrough into said flow of working fluid to provide an electrically conductive layer of protective gas between said surface and said flow of working fluid.

7. In energy conversion apparatus operative with a flow of thermally ionized working fluid, an electrode structure operative with an electrically conductive protective gas, said electrode structure comprising: a porous base member having a surface disposed adjacent said flow of ionized working fluid, said porous base member comprising an electrically insulating material, and protective gas inlet means operatively connected to said base member and being operative to supply said electrically conductive protective gas to said base member to allow said electrically conductive protective gas to pass through the pores thereof to provide an electrically conducting path through said porous base member and to provide an electrically conductive layer of protective gas between said surface and said flow of working fluid.

References Cited by the Examiner

UNITED STATES PATENTS

| | | | |
|---|---|---|---|
| 1,443,091 | 1/1923 | Peterson | 310—11 |
| 2,658,332 | 11/1953 | Nicholson | 253—39.1 X |
| 2,964,678 | 12/1960 | Reid | 315—111 |
| 3,099,131 | 7/1963 | Rosa | 310—11 X |
| 3,102,224 | 8/1963 | Maeder | 322—2 X |

MAX L. LEVY, *Primary Examiner.*

DAVID X. SLINEY, MILTON O. HIRSHFIELD, *Examiners.*